G. L. BENNETT.
CHARGING AND DISCHARGING CONVEYER SYSTEM FOR BRICK KILNS.
APPLICATION FILED DEC. 24, 1907.

1,085,238.

Patented Jan. 27, 1914.

Attest:
E. O. Mitchell
P. V. Wening.

Inventor:
George L. Bennett
by Frothingham & Wentworth
his Attys.

G. L. BENNETT.
CHARGING AND DISCHARGING CONVEYER SYSTEM FOR BRICK KILNS.
APPLICATION FILED DEC. 24, 1907.

1,085,238.

Patented Jan. 27, 1914.

Inventor:
George L. Bennett
by Frothingham Wentworth
his Attys.

UNITED STATES PATENT OFFICE.

GEORGE L. BENNETT, OF TRENTON, NEW JERSEY.

CHARGING AND DISCHARGING CONVEYER SYSTEM FOR BRICK-KILNS.

1,085,238. Specification of Letters Patent. Patented Jan. 27, 1914.

Application filed December 24, 1907. Serial No. 407,971.

*To all whom it may concern:*

Be it known that I, GEORGE L. BENNETT, a citizen of the United States, residing at Trenton, in the county of Mercer and State of New Jersey, have invented certain new and useful Improvements in Charging and Discharging Conveyer Systems for Brick-Kilns, of which the following is a specification, reference being had therein to the accompanying drawings, which form a part thereof.

My invention relates to charging and discharging conveyer systems for brick kilns, and more particularly to a type thereof employing a belt conveyer.

The main object of the invention is to provide a conveyer system for brick kilns which not only will be so constructed as to be capable of being removed from the kiln while the bricks are being fired or burnt, but which will when installed for use, present a continuous direct conveying surface always so positioned with regard to the kiln space into or out of which bricks are to be moved as to require the minimum of manual labor and so as to have a capacity equal to the manual labor of loading and unloading upon and from same.

A further object is to provide a conveyer system, the portion of which within a kiln, will be capable of such adjustment as to permit the complete and convenient charging or discharging of the entire kiln, without disturbing the portion thereof without the kiln.

A still further object is to so construct and arrange the various mechanisms that they may be quickly installed and removed. And a still further object is to provide in such a system, means for handling raw bricks, and transferring them from one belt to another to permit the bricks to be conveyed over an irregular course without necessitating the manual transfer of the raw bricks, or likelihood of loss through breakage.

The invention consists in the novel features of construction and combination of parts hereinafter set forth and described, and more particularly pointed out in the claims hereto appended.

Referring to the drawings.

Like letters refer to like parts throughout the several views.

Owing to the peculiar conditions under which a conveyer for brick kilns must be used, it is essential that the conveyer system should be such as to be readily installed in the kiln and as readily removed therefrom, owing to the impossibility of making the parts of refractory material, which will stand up, at the temperatures maintained within the kiln, while the bricks are being fired or burnt. Heretofore special types of conveyers have been employed for this purpose, but in all these, special carriers have been provided, each of which holds a plurality of bricks such as a man would ordinarily grasp, there being no continuity of the conveying surface. In some of these the said carriers have been secured to a moving chain or cable while in others they have been supported from trolleys in a manner to run under gravity from the kiln. In both of these types, however, there is the objection that the conveyer does not present a continuous receiving surface and its range of operation is substantially fixed, thus requiring additional labor in carrying bricks to and from the line of the conveyer. There are also the objections in this type that the discharge end is frequently below the level of the car, or other means carrying bricks from the kiln and that said systems are not suited for conveying the green or raw bricks to the kiln.

In my invention I aim to provide a conveyer system which may be used for both discharging and charging a kiln, the use of the conveyer belt adapting the device to the purpose of handling both green and baked bricks, while presenting a continuous conveying surface so as to minimize the loss of capacity through irregular movement of the laborers. I also provide a conveyer system wherein the bricks may be conveyed from a point adjacent to the drier house, to any part of the plant, to be charged into the kilns, without likelihood of injury to the raw bricks and also wherein the level of the delivery end in charging or the receiving end in discharging, may be changed to accommodate it to the height of the brick pile, and the lateral position thereof may be varied to provide a clear field for stacking the bricks, or bringing the conveyer closer to the pile of baked bricks.

In the accompanying drawings I make only a diagrammatic showing of the system in its entirety, owing to the difficulties of making a detailed showing, and in various other views have shown the detailed mechanism of the various parts contributing to the successful operation of the device.

In the following description I have considered, first, the system as an entirety; second, the ordinary construction and arrangement of the individual kiln mechanisms; and lastly, the various details affecting the mode of operation referred to in the general description.

Figure 1:
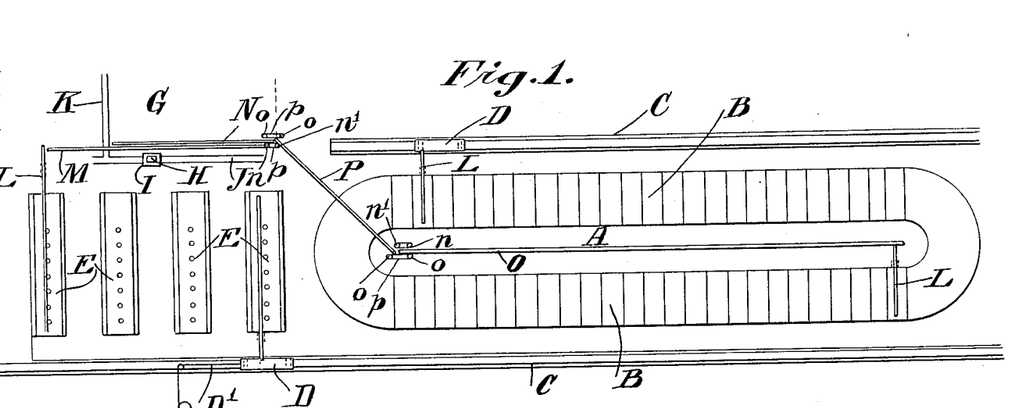
Figure 1 is a diagrammatic plan view of a brick plant employing two types of kiln, showing my invention applied thereto.

Referring to Fig. 1 of the drawings, A indicates a modern type of kiln, consisting of a central yard, with a plurality of individual kilns B in communication therewith and opening outwardly thereof toward the railway tracks C for bringing the cars D to the kiln to facilitate the economical discharging thereof. E E indicates a battery of individual kilns having no common charging space. With the type of kilns shown at E, it is the common practice to have the railway siding extend across one end thereof only, the other end being toward the drier house, shown at G. The raw bricks are brought from the dry house in cars H which are adapted to be run on the cars I moving upon the tracks J parallel to the open ends of the kilns E, auxiliary tracks K being provided to store the empty drier cars. The raw brick is conveyed from the drier car by means of belt conveyers M, N the first of which discharges directly on to the receiving end of the individual kiln conveyer, L, and the second of which discharges on to such a conveyer, L over a series of belt conveyers, comprising a house conveyer O and a diagonal conveyer P, extending from the conveyer N to the conveyer O. As the conveyers L are moved laterally in charging or discharging a kiln, it is necessary to bring the outer end thereof close to the edge of the conveyer M or O and provide a transfer mechanism for moving bricks across the gap between the two conveyers. Each conveyer L is mounted upon a movable car which not only supports the outer end of the conveyer but also carries the belt driving mechanism. The inner end of each conveyer L is supported from the kiln in a manner to insure its simultaneous lateral movement with the car, and the vertical adjustment of said inner end independently of that of the car, so as to permit the outer end to remain fixed, while affording a range of movement of the inner end of the conveyer L which will bring it into operative relation to all parts of the kiln from top to bottom. The car upon which the contents of the kilns B E are loaded from the conveyers L, is adapted to be gradually and continuously advanced while being loaded, an electric winch, not shown, and a haul rope D' being preferably provided for this purpose.

Figure 5:
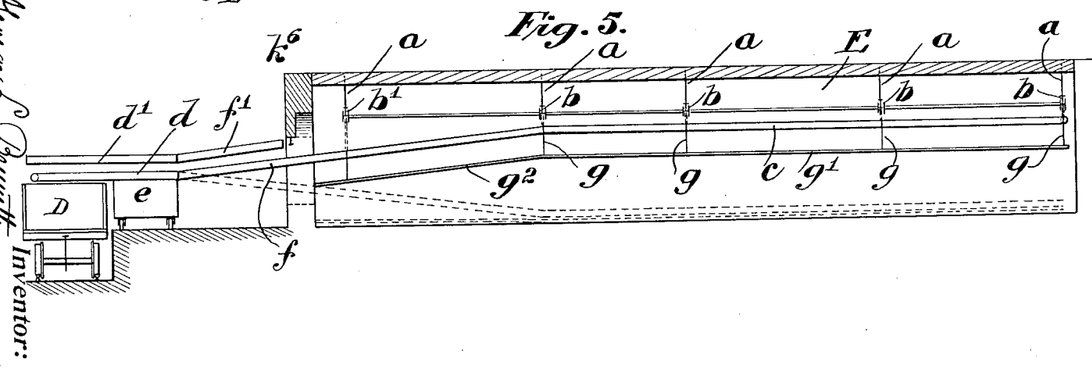
Fig. 5 is a diagrammatic side elevation of a single kiln illustrating the application of my invention thereto.
Figures 6, 7, 8, 9:
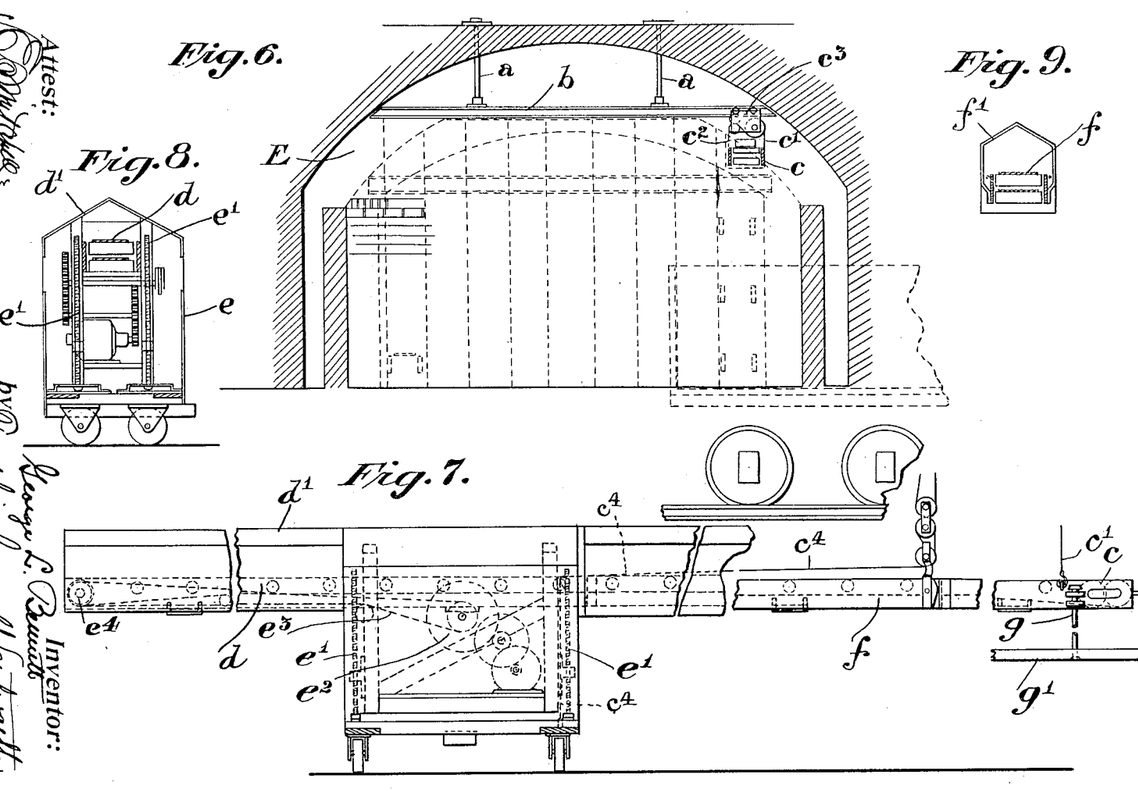
Fig. 6 is a similar showing of a cross section of the kiln, the front elevation being indicated in dotted lines.
Fig. 7 is a detail side view of the conveyer proper and its driving mechanism.
Fig. 8 is a cross section of the driving mechanism and its carrier.
Fig. 9 is a cross section of the intermediate section of the conveyer.
Figure 10:
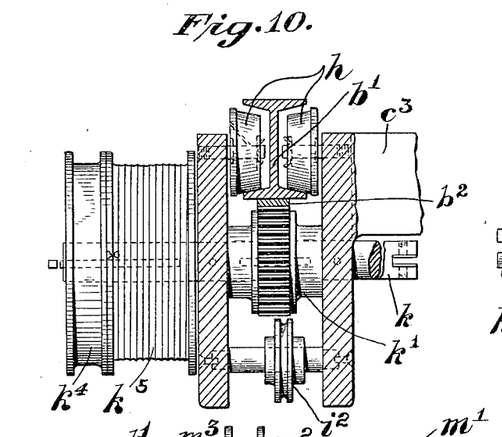
Fig. 10 is one side of the carriage carrying the main lateral driving mechanism.
Figure 11:
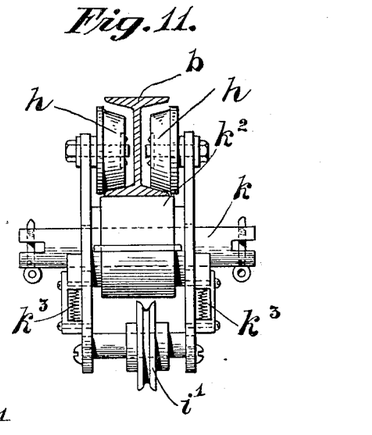
Fig. 11 is a similar view of the auxiliary carriage for the lateral driving mechanisms.
Figures 12, 14:
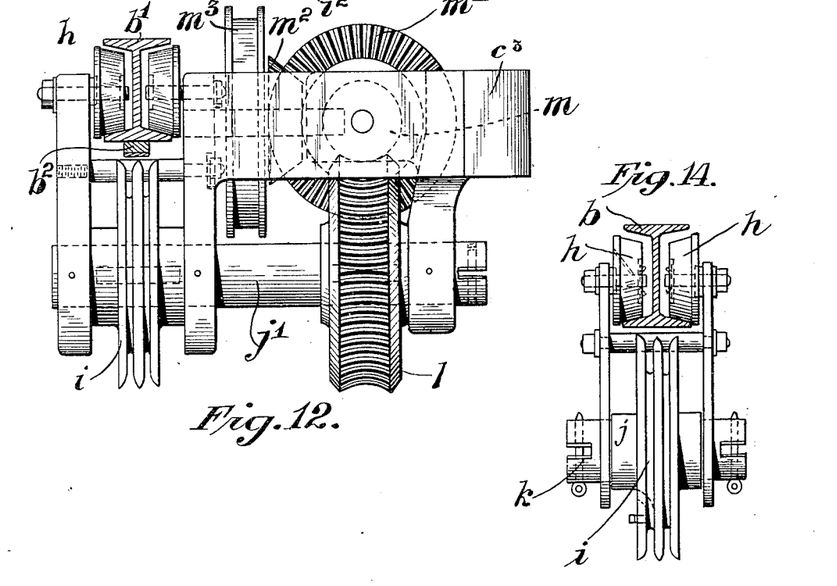
Fig. 12 is the other side elevation of the mechanism shown in Fig. 10 showing the main raising and lowering mechanism forming a part of the same unit, but no part of the lateral driving mechanism.
Fig. 14 is the other side elevation of an auxiliary lateral driving mechanism, but showing no part of the lateral driving mechanism.

Referring more particularly to Figs. 5 and 6 the ends of the kiln B—E are provided with a wide doorway, which may be closed by any suitable curtain of refractory material, and of a height sufficient to permit the insertion of the conveyer thereinto and its elevation to a point adjacent to the top of the kiln. The roof of the kiln has openings therein arranged in parallel rows on opposite sides thereof adapted to receive suspension rods $a$ the lower ends of which are connected in any desired manner with I-beams extending from side to side of the kiln parallel to the front wall thereof having their ends blocked in any desired manner to hold them firmly in place. These I-beams are distanced apart sufficiently to sustain the conveyer, no special distance being requisite, such being a mere matter of judgment. Each of these beams forms a track for a carriage supporting the conveyer, which carriage is adapted to move laterally on said beam. The rods $a$ are separable from the beams $b$ these parts being removed from the kiln while the bricks are being baked therein. The conveyer section $c$ is supported from cables or other suspenders $c'$ $c^2$ carried by the carriage $c^3$ and is adapted to be raised or lowered thereby, simultaneously throughout its entire length. The conveyer section $d$ is mounted upon a car $e$ and is fixed relative to said car, which latter, as will appear more fully hereinafter, may be vertically adjusted, such adjustment however, having no relation to that of the section $c$. Connecting the sections $c$ $d$ is an intermediate section $f$ which is hinged to both of said other sections. The sections $c$ $f$ are each made of a plurality of sections which carry side plates and rollers, and are adapted to be united to form a continuous conveyer. Each said section is a unit, or a plurality of units. The belt of said conveyer is also made in sections being provided with any suitable type of belt fastening, none being shown, inasmuch as this is a well known conveyer practice. The supports $c'$ $c^2$ for the section $f$ are secured thereto substantially midway between its ends, and differ in their mode of operation from the other said supports in that they are so arranged as to cause said intermediate section at its point of suspension, to have only one half of the movement of the conveyer section $c$. To distinguish this mechanism from that of the other supports, for the conveyers, I have designated the I-beam therefor by the reference letter $b'$. The sections $f$ $c$ have on one side thereof vertical sockets adapted to carry a plurality of rods $g$ the lower ends of which support a running board composed of two parts $g'$ and $g^2$ hinged together, which running board is adapted to be carried by the conveyer, while permitting the rods $g$ to slide in the sockets carried by the sections $c$ $f$ to permit the conveyer to be lowered after the said running board rests upon the ground. The section $d$ is inclosed by a housing $d'$ and the section $f$ is partly inclosed by a similar housing $f'$, thus protecting that part of the belt which is outside of the kiln. The car $e$ carries therein a frame mounted upon screw threaded standards $e'$ by means of which the said frame may be raised or lowered to bring the end $d$ of the conveyer to a level which will establish the proper relation between it and the car D. At $e^2$ I have shown an ordinary motor driven, belt driving mechanism, the chain $e^3$ extending to the sprocket or driving pulley $e^4$ whereby the belt is driven. The details of the conveyer belt, side plates and rollers are immaterial to this invention, being well known in the art of conveyers. The carrier $c^3$ running on the track $b'$ differs in construction from the remaining carriers in that it carries the main actuating mechanism for imparting lateral travel to the conveyer as well as vertical movement thereto. The various carriers $c^3$, however, have some features in common, to wit:—oppositely disposed trolleys $h$ adapted to enter the channels in the I-beams $b$ $b'$ and so disposed to the end of the said carrier as to balance the same. Each carrier also has mounted therein a sheave $i$ having double channels therein for the supporting cables $c'$ $c^2$, one end of each of which cables is secured to the said sheave, in a manner to cause the rotation of the sheave, to simultaneously take up or let out both said cables. Each carrier also has a pulley $i'$ over which one of the cables $c^2$ passes, to distance the said cables apart so as to permit their attachment to the opposite sides of the conveyer frame. Each carrier also has a shaft section as $j$ $j'$ to which its sheave $i$ is keyed, the adjoining ends of the said sections being provided with means whereby they may be coupled together so as to cause the rotation of one sheave to impart a simultaneous equal movement to all others. Keyed to said shaft $j'$ is a worm wheel $l$ which is actuated by the worm $m$ carried by the bevel gear $m'$. This bevel gear is in mesh with a bevel pinion $m^2$ secured to a hoisting wheel $m^3$ adapted to be actuated by a hand chain. This mechanism not only permits a gradual lowering or elevation of the conveyer but also locks the conveyer in any position in which it may be adjusted. The detailed construction of this driving mechanism is a matter of mechanical skill, however. The cables $c'$ $c^2$ are secured directly to the conveyer frame in all cases except those from the carrier running on tracks $b'$ wherein a double pulley is interposed between each said cable and the intermediate section $f$ and separate cables $c^4$ support the conveyer by having one end thereof fastened to the fixed part of the car $e$ after being passed around a pulley on the movable part thereof and the other end thereof to the said conveyer section, after passing around said pulley. This arrangement will cause the shortening or elongation of the cables $c'$ $c^2$ connected to the said double pulleys to result in a movement of said section of only one half of the length of the quantity of cable let out or taken up. It will thus be observed that the rotation of the sheave $i$ will simultaneously result in the lowering or elevation of the conveyer section $c$ to an extent proportionate to the peripheral travel of the sheaves $i$ and the proportionate lowering or elevation of the intermediate section $f$ equaling one half such peripheral travel, at a point exactly half way between its hinged ends thus permitting said intermediate section to assume any desired angle, without such a buckling as would tend to distort it or interfere with the perfect operation of the conveyer belt. The cables $c^4$ passing about the intermediate pulleys between the section $f$ and the cables $c'$ $c^2$ also have the function of raising or lowering the said section simutlaneously with the raising or lowering of the movable part of the car $e$, the pulley system shown resulting in a movement amounting to one half of the movement of said movable section of the car $e$. If it be found necessary to provide additional supporting cables to the intermediate section $f$, these supporting cables may be attached at points of said section distant equally from said middle point, and the interposed pulley so arranged as to a proportionately greater or smaller lifting or lowering action, from the fixed section $d$, thus causing the point or points of support to move proportionately to their distance from the section $d$, or the point of connection of the section $f$ thereto, so as to maintain the section $f$ in a straight line between the sections $d$ $c$. The passage of each of the cables $c^4$ about a pulley on the movable part of the car $e$, while its end is secured to the fixed end of said car, causes the raising or lowering of the movable part of the car to take up or let out enough of said cable to cause a proportionate raising or lowering of the intermediate section $f$ to maintain its perfect alinement. The I-beam $b'$ has a rack $b^2$ on its under side. Mounted in the carrier $c^3$ moving on the beam $b'$ is a shaft section $k$, which is adapted to be alined with and coupled to a similar shaft $k$ in each of the other sections. Keyed to said shaft is a gear $k'$ meshing with the rack $b^2$, an arrangement which will insure a positive movement of the carriage and its gear $k'$, as the shaft $k$ is rotated. Each of the other carriages $c^3$ has a friction roller $k^2$ forced into engagement with the bottom of an I-beam $b$ by spring pressed journal housings $k^3$ as shown in Fig. 11, to secure the desired tractive force to insure the lateral travel of the carriage when the shaft $k$ is turned. The end of the shaft section $k$ projects from the frame of its carriage $c^3$, and has keyed thereon a hoisting wheel $k^4$ and a drum $k^5$. The said wheel $k^4$ is adapted to rotate the shaft $k$ when turned by an ordinary hand chain or cable. The said drum $k^5$ is for the purpose of insuring a simultaneous lateral movement of the car $e$ with that of the conveyer. Adapted to be wound upon the drum $k^5$, is a rope or cable $k^6$ which is conveyed by a suitable pulley system to the car $e$ to which it is attached. The drum $k^5$ thus avoids the formation of any slack in the rope or cable $k^6$ between the car $e$ and the carriage $c^3$, and exerts a direct pull on the car $e$ equal to the amount of lateral movement of said carriers. This result is secured by making the drum $k^5$ twice the diameter of the gear $k'$, thus causing said drum to take up twice the length of rope or cable as said carrier travels. The carriers $c^3$ are so assembled that the various parts carried thereby constitute a unit, the ends of the suspenders $c'$ $c^2$ being provided with any desired means for removably securing them to their section of the conveyer frame.

It will be observed that by the construction above referred to, a conveyer may be made up of a plurality of detachable sections, capable of being adjusted, vertically and laterally, by a simultaneous uniform movement, the proper substantial alinement of parts being maintained through the agency of a sectional shaft the various sections of which may be alined and temporarily coupled. It will also be observed that all adjustments may be effected from a single point relative to said shaft.

Figures 2, 15:
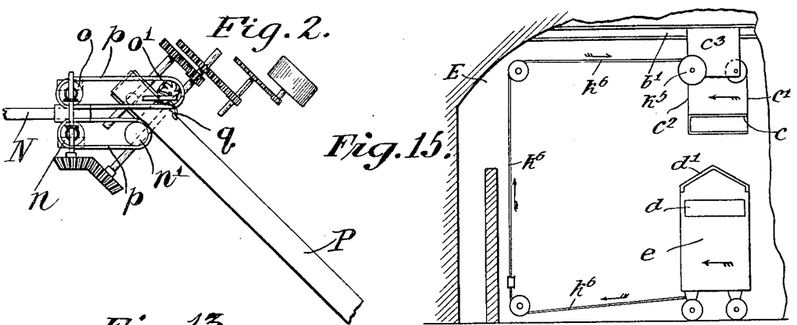
Fig. 2 is a detail plan view of the transfer mechanism between the supply belt, and the intermediate belt.
Fig. 15 is a view illustrating the mode of transmitting lateral movement to the conveyer.
Figures 3, 4, 13:
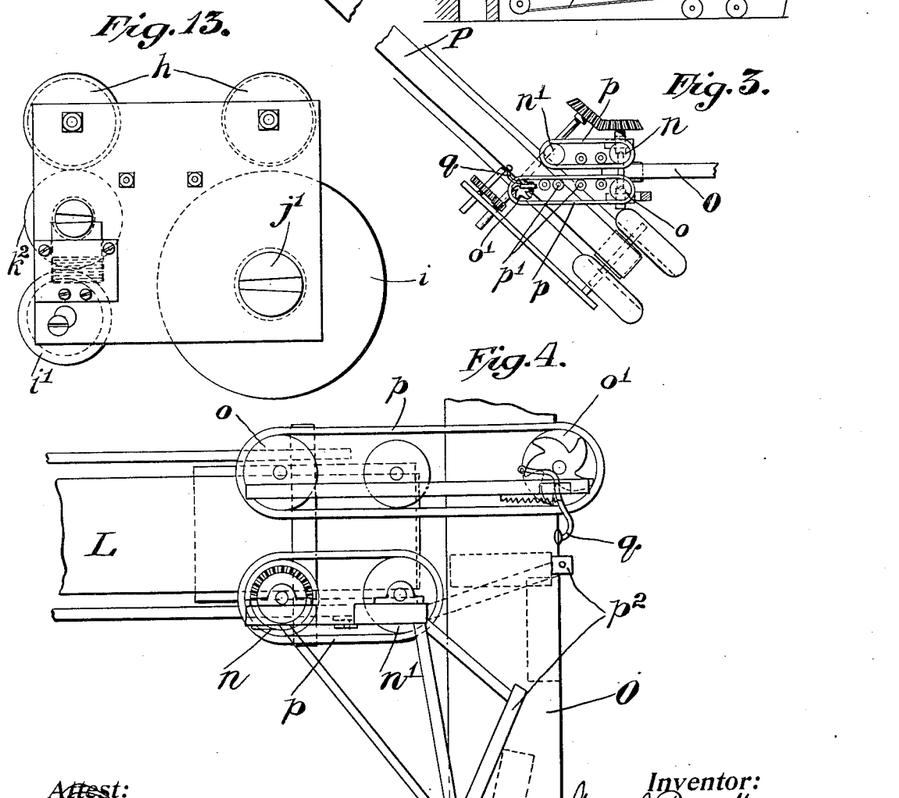
Fig. 3 is a similar view of the transfer mechanism from the said intermediate belt to the feed belt.
Fig. 4 is a detail view of a part of the feed belt, showing the manner of installing an individual kiln belt relative thereto.
Fig. 13 is an end elevation of an entire unit carrying an auxiliary lateral driving, and a raising and lowering, mechanism.

In transferring the green or raw brick from the conveyer N to the conveyer O, or from the conveyer M or O to the conveyer L it is essential to provide some means to take each brick from the conveyer M N or O deposit it upon the intermediate conveyer P, or conveyer L and transfer it from said conveyer P to the conveyer O, and from the conveyer O or M to the kiln conveyer L all of which must be done without injury to the brick. As it is impracticable to do this by hand, and impossible to have one conveyer discharge automatically directly to another, I provide transfer mechanisms adjacent to each end of the intermediate conveyer P and at the outer end of each conveyer L which respectively overlaps the end of the conveyer belts N, and that of the conveyer belt O, and the belts M and O at any point thereof, where the end of the conveyer L may be. The general construction of these transfer mechanisms is substantially identical, their mode of operation being in the main such as to be reversible, to cause each to perform all of the functions of the other. Each said transfer mechanism comprises two pairs of pulleys $n$ $n'$ $o$ $o'$, through one of which as $n$ $o$ two endless grippers $p$ are continuously driven at a velocity equal to or greater than that of the belts of the conveyer. The gripper $p$ preferably comprises an endless flexible belt of felt or other material, which will not injure the bricks. The various pulleys of one set are so positioned that their peripheries are distant from those of the other set, substantially the thickness of a brick, the gripper $p$ yielding sufficiently to cause them to adapt themselves to bricks varying in thickness. I provide suitable oppositely disposed rollers $p'$ to cause said grippers to exert uniform pressure throughout their entire operative run. Ordinarily the bricks are set upon one edge but sometimes topple over upon the side. To prevent such a misplaced brick from blocking the transfer mechanism, I use one set of pulleys about which the grippers pass, having a narrower face than that of the opposite pulleys, and spaced away from the conveyer belt a distance greater than the thickness of a brick, so that the gripper belt may yield and permit an overturned brick to pass under the narrow faced pulley. One set of the pulleys n n' are spaced together nearer than the others o o', the end of the latter beyond the former extending over the intermediate conveyer belt P. At the receiving end of this belt P, this extended end serves merely to afford sufficient friction surface to prevent the brick dropping from the transfer mechanism prematurely, while at the delivery end it serves as a moving bumper, to receive the brick, and guide it between the two belts p. The curved end of the grippers p will serve to receive and line up bricks which may be delivered thereto from the conveyer N. To prevent bricks accummulating and colliding at the discharge end, I provide a tapper q which acts to give a slight starting impulse to each brick as it comes against the belt p at the discharge end of the conveyer P. This tapper comprises a vibratory member pivoted adjacent to the longer gripper belt p and having one end thereof positioned above the conveyer belt as o, the other end thereof being engaged by a cam wheel q' which tends to tension the spring q² by means of which the tapper is actuated. The wheel q' is mounted upon the shaft of the pulley o' of the gripper belt p. The tapper q is normally out of the path of the bricks upon the conveyer o and its movement being about a vertical axis parallel with that of the shaft of the pulley o', the movement of the gripper has a tendency to thrust a brick in a direction coinciding with the movement of said gripper belt p, to prevent the inertia of the brick overcoming the initial friction between it and the gripper belt necessary to insure the transfer of the brick by means of said gripper belts. The transfer mechanisms at the ends of the conveyer P preferably have their grippers parallel to each other, although such is not necessary. Any desired manner of driving the transfer mechanism may be employed.

After the bricks have been dried, they are removed from the drier house G on the cars H which cars are run upon the transfer cars I, so that if desired, the kilns E may be charged directly from the drier house cars. The transfer cars I as indicated in Fig. 1 may be moved on the tracks J from kiln to kiln for this purpose and also to facilitate the removal of the empty drier cars to the storage track K. When the distance of the kilns E from the drier house makes it more economical to convey the green or raw bricks from the drier house over the conveyer M, the bricks are placed by hand upon said conveyer and automatically transferred to the kiln conveyer leading to the kiln being charged. The arrangement and mode of operation of the conveyers L in charging and discharging the kilns will be described in detail hereinafter. When it is necessary to move the bricks over an indirect course, as in connection with a plant wherein the type of kiln A is used, with a drier house as at G, the green or raw bricks are placed upon the conveyer N, lengthwise as to their direction of movement. As each brick approaches the end of the conveyer N, it passes between the grippers p which are moving in the same direction at the same or slightly greater speed to compensate for any slippage. If the bricks are not positioned perfectly straight the curve of the grippers p about the pulleys n o will line them up as they enter said transfer mechanism. The said grippers will frictionally engage each brick, sufficiently to suspend same between them, without crushing the brick, and carry said brick across the gap between the conveyers N P, P O, M L, or O L. The grippers p presenting as they do, flat substantially parallel surfaces of felt or fabric, do not injure the brick in any way, the action thereof being much the same as when the bricks are carried by hand by the workmen using hand cloths or gloves. The pulleys o o' having their axes distanced farther apart than the pulleys n n' permits the gripper p carried by said pulleys o o' to project over the belt of the conveyer P while the gripper p passing about the pulleys n n' stops just short of said belt in a manner to allow a clearance for the brick after it has been deposited upon the conveyer P or L. The gripper belts being of different lengths as shown will tend to hold the brick substantially alined with the longer gripper p until the shorter gripper disengages itself therefrom, whereupon a brick is delivered upon the conveyer P or L in a manner to prevent its sluing in the direction of the movement of said conveyer P or L. It will thus be observed that the bricks are positioned across the line of travel of the conveyer P instead of along said conveyer as on the conveyer N. As each brick approaches the other end of the conveyer P it contacts with the long gripper p of the receiving transfer mechanism which leads it between the grippers p to convey it edgewise to the belt of the conveyer O in the same manner as described in connection with the other transfer mechanism. To prevent the bricks accumulating at this end of the conveyer through the lack of that friction required to start the feeding movement of each brick, the tapper q is relied on to give a starting impetus to each brick, thus causing the bricks to be fed to said grippers as rapidly as they contact with the long gripper and are trued up. In both transfer mechanisms the auxiliary rollers $p'$ prevent the give or sagging of the grippers to an extent to release the frictional engagement thereof with the brick.

To facilitate the transfer of bricks, which are being conveyed end on, from one conveyer to another when they must be conveyed in the same position, either because of the nature of the conveyer, or the limitations imposed by the mode of operation of the grippers $p$, I provide a deflecting member $p^2$ see Fig. 4, preferably consisting of a laterally pitched inclined guide having a contact surface substantially perpendicular to the belt and a roller or other abutment having a flexible or yielding cover, carried by the transfer mechanism and positioned above and adjacent to the conveyer belt, which will engage one corner of each brick and either impede it so as to cause the other end to turn sidewise of the belt, or deflect it sufficiently to cause it to assume a slanting position relative to the extended end of the gripper so as to have the brick approach the said gripper at such an angle as to be readily lined up therewith when forced against said gripper by the movement of the conveyer belt to enter said grippers without blocking the entrance thereto sufficiently to cause the bricks to accumulate at that point. This construction is desirable in the transfer mechanisms carried by the conveyers L.

The manner of installing the individual kiln conveyers L is the same whether such installation be for the purpose of charging the kiln B E or discharging same, it being necessary in either case to bring the conveyer within accessible distance of all parts of the kiln in order to permit the workmen to pile the raw or green bricks from the conveyer to the kiln, or to remove them from the kiln to the conveyer. The manner of installing for the purpose of charging the kiln and the mode of operation of the conveyer in charging will be described in detail it being understood that in discharging the kiln the operations will be the reverse in all respects except those particularly referred to.

In Fig. 1, I have shown two conveyers L in position preparatory to charging kilns B E those at the extreme right, and left of the figure, and two arranged preparatory to discharging others of said kiln, being the intermediate conveyers. Inasmuch as each conveyer L is capable of being taken apart, it is apparent that a single such conveyer may be used if desired, the showing in the drawings being merely for the purpose of illustrating the application of the invention. In the following description it is assumed that one of the kilns E is empty and the bricks are to be loaded upon the conveyer L therein from the conveyer M or one of the cars H.

Referring more particularly to Figs. 5 and 6, the I-beams $b$ are placed in the kiln in parallel lines positioned below the openings in the roof of the kiln by the suspension rod $a$. Such rods are inserted through said openings and screwed into the tops of said beams until the beams are drawn with their opposite ends close to or against the arched roof of the kiln. By making the rods $a$ of the same length, this action will itself bring the I-beams to the proper level. If there is any tendency of lateral movement of the beams $b\ b'$, in either direction, this may be overcome by wedging the ends, it being particularly necessary that the first beam $b'$ should be perfectly stable. Each I-beam, as it is so positioned, has mounted thereon one of the carriers $c^3$ with the rollers $h$ set into the channels of said beam. The said rollers or trolleys being four in number, are disposed in pairs at opposite ends of the carrier while in communication with the said I-beams, thus preventing any unequal distribution of the weight upon the conveyer, causing the tilting thereof. When all of the I-beams are so positioned, the respective carriers are alined and the suspension ropes or cables $c'\ c^2$ having been unwound to their full extent, the various sheaves $i$ are coupled together so as to be simultaneously rotated. The various units making up the conveyer section $c$ are then placed in the kiln and the ends of the suspension ropes $c'\ c^2$ hooked or otherwise secured thereto. The units of the conveyer section $c$ are then fastened together and the ends of the different parts of the conveyer belt laced or otherwise fastened in any desired manner. The car $e$ is then brought into alinement with the various carriages $c^3$, all being at the extreme left of the kiln, and the intermediate section $f$ hinged to the section $d$, carried by said car, and the section $c$ of the conveyer. The belt sections carried by said permanent end section $d$ and said intermediate section $f$ are then united so as to make a continuous belt conveyer L of the three sections $c\ d\ f$. If it be found that the overhung end of the section $d$ is either too high or too low, relative to the drier cars, as shown to the left of Fig. 1, in relation to the house conveyer O, as shown to the right of said figure, the entire mechanism carrying the said conveyer as well as the driving machinery therefor may be raised or lowered by means of the screw threaded standards $e'$ without affecting the adjustment of the driving mechanism, which is always fixed relative to the driving end of the conveyer. When the parts are so arranged, a man is stationed at the drier car or the receiving end of the conveyer and the necessary number of men, within the kiln. The bricks are picked from the drier car, and placed side by side about six inches apart, edge up upon the conveyer $d\ f\ c$ and are conveyed along the section $d$, down the section $f$ and along the section $c$ to the point where they are to be piled into the kiln. As the bricks approach the delivery end of the conveyer they are removed by the workmen into the kiln, and piled preparatory to being baked or burnt. As under ordinary circumstances the bricks would be piled beginning at the extreme inner end of the kiln relative to the receiving end of the conveyer, the workmen gradually work toward the front of the kiln as the pile of bricks becomes so high as to prevent convenient access thereto. As the pile begins on the floor of the kiln, in order to prevent as little bending as possible, the conveyer section $c$ in starting to charge the kiln would be positioned at its lowermost level, in which position the running board $g'$ $g^2$ is in contact with the floor, the suspension rods $g'$ sliding into the brackets therefor to permit it to take this position. When the entire space conveniently accessible from the conveyer is filled, it is merely necessary for the workmen by actuating the wheel $m^3$ through the hand chain thereof, to rotate all of the sheaves $i$ so as to take up the suspension ropes or cables $c'$ $c^2$ to an extent equaling the height of the bricks already piled in the kiln. This elevation of the conveyer will be uniform throughout its entire length and will be accomplished by a simultaneous movement, the ropes or cables $c'$ $c^2$ being taken up simultaneously on both sides to the same extent thus preserving the level of the conveyer. This movement of the shaft through which the various sheaves are rotated, will impart only one half of the lifting movement to the intermediate section $f$, as to the section $c$, by reason of the interpassed multiple-sheave pulley system, thus preventing the buckling of said section in raising the conveyer. The worm wheel $l$ and worm $m$ and the gear system through which the latter is driven, not only makes it possible for the conveyer to be raised and lowered conveniently by one man, but locks all the sheaves in any position to which they may be brought in a manner to prevent the weight on the cables $c'$ $c^2$ causing an accidental lowering of the conveyer. In Fig. 6, to the left, I have indicated in dotted lines, the first position assumed in loading, and to the right of said figure, the different positions in which the conveyer is positioned for each "cut". In this figure the vertical dotted lines indicate the width of each "cut" or the working range from the conveyer. As the conveyer is raised, the running board $g'$ $g^2$ remains stationary until the conveyer reaches a height greater than the length of the rods $g$ carrying same, and thereafter the workmen handle the bricks by standing and moving along said board. When the bricks are piled to substantially the desired height, throughout the entire length of the kiln, one workman can finish the work by a movement toward the section $d$ of the conveyer, thus being in a position convenient to the operating mechanism of the carrier $c^3$ running on the I-beam $b'$. In charging or discharging the kiln, the rope $k^6$ must run from the drum $k^5$ in the direction in which the conveyer must be fed to bring it to the different vertical planes necessary to handle the bricks in succeeding cuts. Hence if charging from left to right, the rope $k^6$ will run to the right of said drum, and if from right to left, to the left of said drum. The first cut having been filled with bricks, the workman having caused the man loading bricks on the conveyer to cease work, merely turns the wheel $k^4$ in a manner to cause the gear $k'$ to impart a lateral movement to its carrier $c^3$, the engagement of the said gear with the rack $b^2$ insuring a positive feeding movement of said carrier. Said wheel $k^4$, through the sectional shaft $k$ imparts a similar movement to the friction roller $k^2$, thus causing all carriers $c^3$ to have similar, equal lateral movement. The bearings $k^3$ insure the desired tractive force to insure such movement. The entire conveyer may thus be moved to a parallel vertical plane, through the gear $k'$ and rollers $k^2$ excepting the section $d$, thereof, which section will receive equal, similar lateral movement through the winding of the rope $k^6$ on the drum $k^5$. As stated heretofore, the diameter of said drum is twice that of the gear $k'$ thus not only causing a movement of the car $e$ equal to that of the carriers $c^3$, but simultaneously taking up that slack resulting from the movement of said carrier. Thus the entire conveyer including the driving mechanism is shifted, simultaneously throughout its entire length. When this lateral shifting has been effected, the shaft $j$ is turned in the opposite direction to that in raising the conveyer, thus causing each sheave to pay out the cables $c'$ $c^2$ to restore the conveyer to the lowermost level. The raising lateral shifting and lowering is repeated until the conveyer has been brought into the relation to each part of the kiln necessary to permit it to be fully and conveniently charged. The sheaves $i$ being toward one end of the carrier $c^3$ and the pulleys $i'$ toward the other, the ropes or cables $c'$ will pass in a vertical line from the upper part of the former to the conveyer section $c$, and the rope or cable $c^2$ will pass from the lower part of said sheaves, to one side of said carriers, the pulleys $i'$ distancing said cable sufficiently from said sheaves to permit the cable to be attached to the other side of said section. When the kiln is charged, the sections $f$ $c$ are disconnected from each other, and the various units and belt sections in each disconnected. Each unit is then removed from the kiln, the ropes or cables $c'$ $c^2$ being unhooked or otherwise disconnected therefrom to permit such removal. The suspension rods $a$ are then unscrewed from the I-beams and said beams and the carriers $c^3$ removed from the kiln, together with the said rods $a$. The entire conveyer, having thus been removed, the kiln may be fired, and the conveyer installed in another kiln B—E.

The operation of discharging a kiln is the reverse of that heretofore described, the conveyer necessarily being installed in the first instance near the top of the kiln, in the space afforded between the roof and the top of the brick pile. In discharging, however, the first cut will be more difficult, requiring that a proper field for the lowering of the conveyer be provided. After the first cut, however, the succeeding cuts are the same as in charging, except that the portion of the conveyer within the kiln is lowered as the work progresses, instead of being raised. In discharging a kiln, the end of the section $d$ projecting beyond the car $e$ is extended over the side of the ordinary gondola freight car, so as to permit the bricks as discharged to be loaded directly on said car. As the work progresses, the quantity of bricks removed from a single cut, will ordinarily be greater than the capacity of the car adjacent to the discharging end of the said conveyer to obviate which, the car D is gradually and continuously advanced to always provide space in the car for bricks adjacent to the overhung end of the conveyer. It is the aim to keep this end of the section $d$ such a height from the bottom of the car as to make the loading of the bricks thereinto from the conveyer as convenient as possible, and to avoid those conditions as would necessitate the carrying of the brick, or long or slow movements on the part of the workers. In practice, however, it will be found that the height of the gondola cars varies, and hence I provide the adjustment screws $e'$ carrying the frame with the motor and driving mechanism and the section $d$ for the purpose of raising or lowering said section without disturbing the driving mechanism and its adjustment relative to the driving pulley, or the sprocket on the section $d$. This adjustment is effected, by turning each said screw individually, in any desired manner, thus raising or lowering the entire frame carrying the conveyer section and its driving mechanism to the desired extent. This operation would by the change in the height of said section $d$ raise or lower the intermediate section $f$ to an extent to cause said section to buckle slightly by allowing or not allowing slack in its suspension rods or cables were it not that the end of said cables passed over the pulley on the movable part of the car $e$ and is secured to the immovable part of said car so as to cause movement of the movable part of the car to take up or let out slack in the supporting cables $a^4$ proportionate to the change of elevation of the section $d$ causing a corresponding shortening or lengthening of the supports for the section $f$ to cause them to be always under the same tension.

So far as the conveyers L are concerned, it will be observed that the entire delivery end in charging or the receiving end in discharging may be raised or lowered to bring it into the desired relation to the various parts of the kiln without changing the elevation of the receiving end in charging or the delivery end in discharging thus permitting said last mentioned end to have a fixed relation to objects outside of the kiln to facilitate the transfer of bricks to or from said kiln. It is also apparent that the lateral movement of the conveyer does not disturb such a relation of these parts.

By means of the conveyer L adjustable in the manner heretofore described, a continuously driven, direct line, belt conveyer which may be brought within the operative scope of all parts of the kiln, is provided, thus avoiding the use of separate carriers moving with or on a chain or rope following a tortuous course. The workmen in handling the bricks, are required to take only one in each hand, and the conveyer belt under all circumstances presents a surface ready to receive same, thus providing for the irregularities in the movement of the workers. This not only results in the possibility of continuous action in charging and discharging but provides a conveyer capacity in the same kiln.

I have shown and described the mechanism which I employ, with considerable detail, but it is not my intention to limit the invention to such specific features it being apparent that to accomplish the adjustment above referred to the various mechanisms having substantially the same function and mode of operation can be substituted therefor.

While I have herein specified a belt conveyer as being the carrier, I do not desire to restrict the scope of the invention to a belt conveyer, any continuous surface carrier being the equivalent of the belt referred to. Nor do I wish to be understood as limiting the invention to use in conveying bricks, it being adapted for use in conveying various other articles.

Having described the invention, what I claim as new and desire to have protected by Letters Patent is:—

1. In a charging and discharging conveyer system for brick kilns, the combination with a conveyer adjacent to the drier house, a house conveyer, an intermediate conveyer and a transfer mechanism adjacent to each end of said intermediate conveyer, and the adjacent end of said drier house conveyer, and said house conveyer respectively, whereby bricks will be automatically transferred from said drier house conveyer to said intermediate conveyer and from said intermediate conveyer to said house conveyer, of an individual kiln conveyer adapted to be removably installed in a kiln, having one end thereof projected within working range of said house conveyer.

2. In a charging and discharging conveyer system for brick kilns, the combination with a conveyer adjacent to the drier house, a house conveyer, an intermediate conveyer, and a transfer mechanism comprising two sets of pulleys each rotating about a substantially vertical axis, said sets of pulleys being alined in two opposite parallel surfaces, gripper belts running about each set of pulleys, one such mechanism being disposed above the adjacent ends of said drier house conveyer, and said intermediate conveyer, and another such mechanism being disposed above the adjacent ends of said intermediate conveyer and said house conveyer, whereby each brick as it approaches the end of said drier house conveyer, or said intermediate conveyer, will be engaged by said grippers and transferred to said intermediate, or said house conveyer, of an individual kiln conveyer adapted to be removably installed in a kiln, having one end thereof projected within working range of said house conveyer.

3. In a charging and discharging conveyer system for brick kilns, the combination with a conveyer adjacent to the drier house, a house conveyer, an intermediate conveyer, and a transfer mechanism comprising two sets of pulleys rotating about a substantially vertical axis, said sets of pulleys being alined in two opposite parallel surfaces, the pulleys in one set being distanced farther apart than those in the other set, a gripper belt running about each set of pulleys, one such mechanism being disposed above the adjacent ends of said drier house conveyer, and said intermediate conveyer, and another such mechanism being disposed above the adjacent ends of said intermediate conveyer, and said house conveyer, each said longer gripper belt being extended over said intermediate conveyer, whereby each brick as it approaches the end of said drier house conveyer, or said intermediate conveyer, will be engaged by said gripper and transferred to said intermediate, or said house conveyer, of an individual kiln conveyer adapted to be removably installed in a kiln, having one end thereof projected within working range of said house conveyer.

4. In a charging and discharging conveyer system for brick kilns, the combination with a conveyer adjacent to said drier house, a house conveyer, an intermediate conveyer, and a transfer mechanism comprising two sets of pulleys rotating about a substantially vertical axis, said sets of pulleys being alined in two opposite parallel surfaces, the pulleys in one set being distanced farther apart than those in the other set, a gripper belt running about each set of pulleys, one such mechanism being disposed above the adjacent ends of said drier house conveyer and said intermediate conveyer, and another such mechanism being disposed above the adjacent ends of said intermediate conveyer and said house conveyer, each said longer gripper belt being extended over said intermediate conveyer, and a vibratory tapper adjacent to the gripper belt at the discharge end of said intermediate conveyer whereby each brick as it approaches the end of said drier house conveyer, or said intermediate conveyer, will be engaged by said gripper belts and transferred to said intermediate, or said house conveyer, of an individual kiln conveyer adapted to be removably installed in a kiln, having one end thereof projected within working range of said house conveyer.

5. In a charging and discharging conveyer system for brick kilns, means whereby bricks are transferred from one conveyer to another, comprising two sets of pulleys rotating about substantially vertical axes, said sets of pulleys being alined in two opposite substantially parallel surfaces, the pulleys in one set, being distanced farther apart than those in the other, and a gripper belt running about each set of pulleys.

6. In a charging and discharging conveyer system for brick kilns, an individual kiln conveyer comprising a conveyer frame adapted to be temporarily installed within a kiln, a carrying member disposed on a substantially horizontal plane, means whereby said conveyer frame may be raised or lowered, whereby the entire surface of said member within the kiln may be brought to different levels to faciliate the charging or discharging of the kiln, and means whereby said frame may be shifted laterally.

7. In a charging and discharging conveyer system for brick kilns, an individual kiln conveyer comprising a movable car, a conveyer section carried thereby, a conveyer section within the kiln, an intermediate conveyer section, means whereby said section within the kiln may be raised or lowered throughout simultaneously, and means whereby said car and said conveyer sections may be moved laterally simultaneously.

8. In a charging and discharging conveyer system for brick kilns, an individual kiln conveyer comprising a plurality of tracks, means supporting same temporarily, in a kiln, a plurality of carriers mounted on said tracks, a car, a conveyer section carried thereby, a conveyer section within said kiln, supports between said section within the kiln, and said carrier respectively, means whereby all said supports may be shortened or lengthened simultaneously, a conveyer section connecting said other conveyer sections, and means imparting simultaneous lateral movement to said carriers and said car.

9. In a charging and discharging conveyer system for brick kilns, an individual kiln conveyer comprising a plurality of tracks, means supporting same temporarily, in a kiln, a plurality of carriers mounted on said tracks, a car, a frame mounted therein, means whereby said frame may be raised or lowered, a driving mechanism carried by and movable with said frame, a conveyer section carried by said frame, having an end projecting beyond said car, a conveyer section within the kiln, supports between said carriers and said conveyer section within the kiln, means whereby said supports may be simultaneously shortened or lengthened, an intermediate conveyer section connecting said other conveyer sections, and means imparting simultaneous lateral movement to said carriers and said car.

10. In a charging and discharging conveyer system for brick kilns, an individual kiln conveyer comprising a plurality of tracks, means supporting the same temporarily in a kiln, a plurality of carriers mounted on said tracks, a car, a conveyer section carried thereby, a conveyer section within the kiln, supports between said section within the kiln, and said carriers respectively, an intermediate conveyer section, supports for said intermediate section extending from its carrier or carriers, a reducing pulley system, between said intermediate sections and its supports, means whereby all said supports may be shortened or lengthened simultaneously, and means imparting simultaneous lateral movement to said carriers and said car.

11. In a charging and discharging conveyer system for brick kilns, an individual kiln conveyer comprising a plurality of tracks, means supporting the same temporarily in a kiln, a plurality of carriers mounted on said tracks, a car, a frame mounted therein, means whereby said frame may be raised and lowered, a driving mechanism carried by and movable with said frame, a conveyer section carried by said frame, having an end projecting beyond said car, a conveyer section within the kilns, supports between said section within the kiln, and said carriers respectively, an intermediate conveyer section, supports for said intermediate conveyer section extending from its carrier or carriers, a reducing pulley system between said intermediate section and its supports, one end of the rope of which passes about a guide carried by said movable frame, and is attached to said car, whereby the length of the supports for the intermediate section will be varied with the height of the frame, means whereby all supports may be shortened or lengthened simultaneously, and means imparting simultaneous lateral movement to said carriers and said car.

12. In a charging and discharging conveyer system for brick kilns, an individual kiln conveyer comprising a plurality of tracks, means supporting same temporarily in a kiln, a plurality of carriers mounted on said tracks, each said carrier being a unit, a continuous belt conveyer comprising a section without the kiln, a section within the kiln, and an intermediate section, means carrying said section without the kiln, said section within the kiln, and said intermediate section being composed of a plurality of units separably united, supporting means extending from the opposite sides of each said carrier, to the opposite sides of said conveyer section within the kiln, and said intermediate section, means whereby all said supporting means may be shortened or lengthened simultaneously and means imparting simultaneous lateral movement to said carrier and said supporting means for said conveyer section without the kiln.

13. In a charging and discharging conveyer system for brick kilns, an individual kiln conveyer comprising a conveyer frame, having socket plates along the edge thereof, rods slidably mounted in said sockets, and adapted to engage the tops thereof, a sectional running board carried by said rods on a plane below said frame, a belt, means driving said belt, means whereby said conveyer frame may be raised and lowered and means whereby said frame may be shifted laterally.

14. In a charging and discharging conveyer system for brick kilns, an individual kiln conveyer, comprising a plurality of tracks, means supporting same temporarily in a kiln, a plurality of carriers mounted on said tracks, each said carrier comprising a frame having rotatably mounted toward one side thereof a shaft carrying a double sheave or drum, a pulley toward the opposite side thereof, rollers whereby said carrier is mounted on said track, and means whereby lateral movement may be imparted to said carrier, a belt conveyer, a plurality of supporting cables attached to said sheave or drum one of which cables passes directly to the frame of said conveyer, on one side, and the other over said pulley to the frame of said conveyer on the other side, means coupling all said sheaves together, means simultaneously rotating all said shafts to the same extent, whereby said conveyer will be simultaneously raised or lowered throughout its entire length, and means actuating said means imparting lateral movement to said carrier.

15. In a charging and discharging conveyer system for brick kilns, an individual kiln conveyer, comprising a plurality of tracks, means supporting same temporarily in a kiln, a plurality of carriers mounted on said tracks, each said carrier comprising a frame having rotatably mounted toward one side thereof a shaft carrying a double sheave or drum, a pulley toward the opposite side thereof, rollers whereby said carrier is mounted on said track, and means whereby lateral movement may be imparted to said carrier, a belt conveyer, a plurality of supporting cables attached to said sheave or drum one of which cables passes directly to the frame of said conveyer, on one side, and the other over said pulley to the frame of said conveyer on the other side, means coupling all said sheaves together, means simultaneously rotating all said shafts to the same extent, whereby said conveyer will be simultaneously raised or lowered throughout its entire length, comprising a worm wheel carried by the shaft on one of said sheaves, a worm mounted on the carrier carrying said worm wheel, and means rotating said worm and means actuating said means imparting lateral movement to said carrier.

16. In a charging and discharging conveyer system for brick kilns, an individual kiln conveyer, comprising a plurality of tracks, means supporting same temporarily in a kiln, a plurality of carriers mounted on said tracks, each said carrier comprising a frame carrying adjustable supports for a conveyer, and means imparting lateral movement to all of said carriers simultaneously, comprising a rack carried by the under side of one of said tracks, a gear mounted on the shaft of one of said carriers engaging said rack, a traction wheel mounted on a shaft carried by each said other carrier, coupling means engaging all said shafts, and means rotating said shaft, and a conveyer section carried by said supports.

17. In a charging and discharging conveyer system for brick kilns, an individual kiln conveyer, comprising a plurality of tracks, means supporting same temporarily in a kiln, a plurality of carriers mounted on said tracks, each said carrier comprising a frame carrying adjustable supports for a conveyer, and means imparting lateral movement to all of said carriers, simultaneously, comprising a rack carried by the under side of one of said tracks, a gear mounted on the shaft of one of said carriers, engaging said rack, a traction wheel mounted on a shaft carried by each said other carriers, coupling means connecting all said shafts, and means rotating said shafts, a car, a conveyer section carried thereby, a conveyer section within the kiln, an intermediate conveyer section, said conveyer section within the kiln being supported by said adjustable supports, a drum mounted on said shaft, said drum being twice the diameter of said gear, and a rope or cable carried by said drum, and extending around a pulley system to said car, whereby the rotation of said shaft will impart the same quantity of lateral movement to said car, as to said carriers.

18. In a charging and discharging conveyer system for brick kilns, the combination of a plurality of independent conveyers extending over an irregular course, said conveyers being all upon substantially the same plane and the end of one conveyer extending in close juxtaposition to, but not overlapping the other, and a transfer mechanism extending over the adjoining ends of the said conveyers whereby objects are automatically transferred from one conveyer to another.

19. In a charging and discharging conveyer system for brick kilns, the combination with an individual kiln conveyer having a projecting discharge end, and a car or other agency adapted to have movement under said projecting end of said kiln conveyer for conveying bricks or other objects from the kiln, and means for gradually and continuously moving said car or other agency across the discharge end of said conveyer whereby all parts of said car or other agency are brought within the range of the discharge end of the said conveyer.

20. In a charging and discharging conveyer system for brick kilns, means whereby bricks are transferred from one conveyer belt to another, comprising two sets of pulleys rotating about substantially vertical axes, the said sets of pulleys being alined in two opposite substantially parallel surfaces, the pulleys in one set being distanced farther apart than those in the other and adapted to project over a conveyer, a gripper belt running about each said set of pulleys and a reciprocating member acting on a line substantially parallel with and between said grippers whereby a starting impulse is imparted to an object in engagement with said projected gripper.

21. In a charging and discharging conveyer system for brick kilns, means whereby bricks are transferred from one conveyer to another comprising two sets of pulleys rotating about substantially vertical axes, said sets of pulleys being alined in two opposite substantially parallel surfaces, the pulleys in one set being distanced farther apart than those in the other, whereby it may be projected over a conveyer, a gripper belt running about each set of pulleys and a deflector forwardly of said projected end and adapted to extend over a conveyer, whereby the position of objects on said conveyer will be so changed as to direct same against said projected gripper in the desired position.

22. In a charging and discharging conveyer system for brick kilns, means whereby bricks are transferred from one conveyer belt to another comprising two sets of rollers rotating about substantially vertical axes, said sets of pulleys being alined in two substantially parallel surfaces and a gripper belt running about each set of pulleys one set of pulleys being so arranged above the conveyer belt as to permit an object to pass thereunder while being engaged by said grippers.

In witness whereof, I have hereunto affixed my signature this 10th day of December, 1907, in the presence of two witnesses.

GEORGE L. BENNETT.

Witnesses:
JANE E. BARBER,
CHARLES E. SALISBURY.

Copies of this patent may be obtained for five cents each, by addressing the "Commissioner of Patents. Washington, D. C."